United States Patent Office

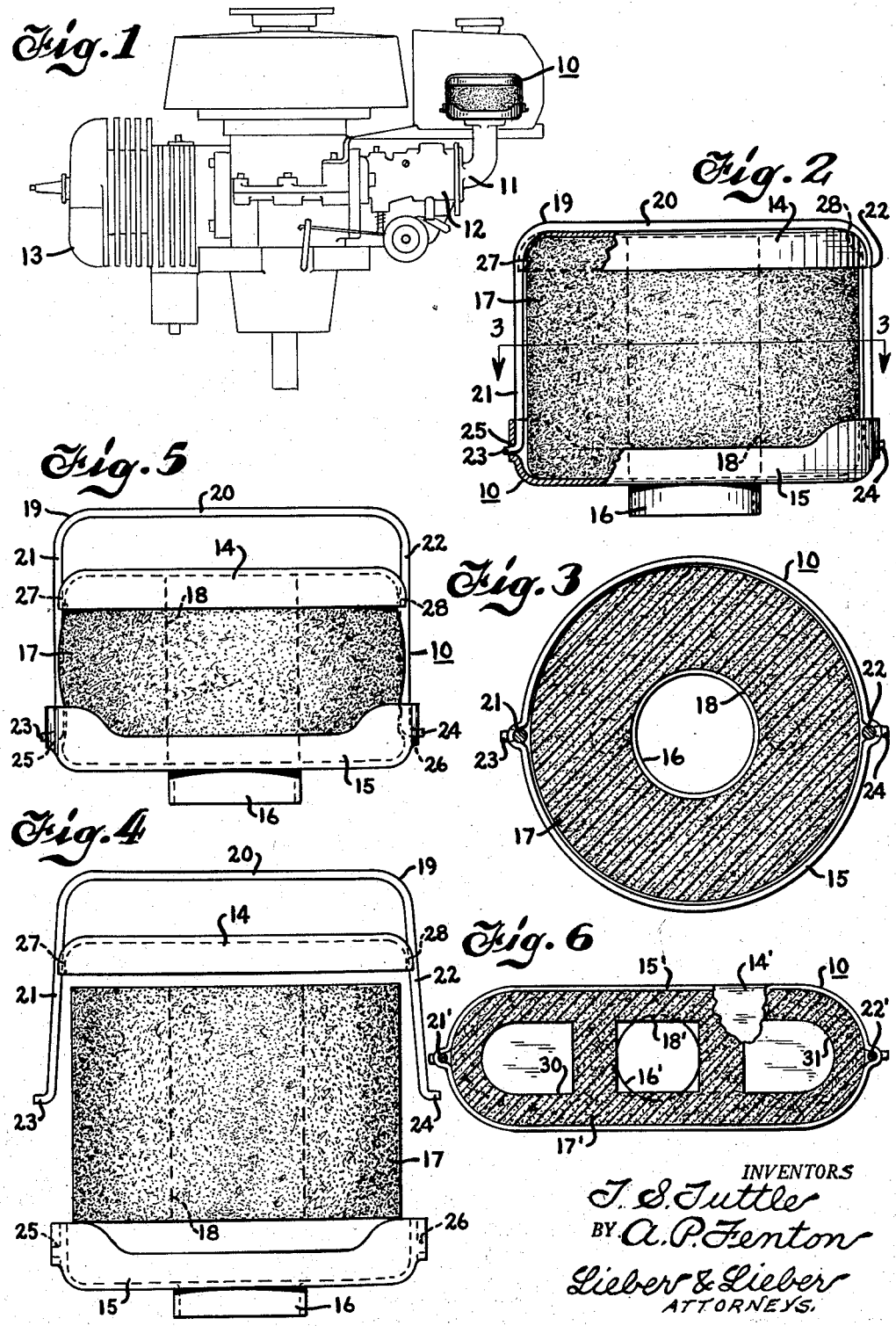

2,920,717
AIR FILTER

Thomas S. Tuttle, Wauwatosa, and Alvin P. Fenton, Kohler, Wis., assignors, by mesne assignments, to Tecumseh Products Company, Tecumseh, Mich., a corporation of Michigan Application February 19, 1957, Serial No. 641,054

5 Claims. (Cl. 183—44)

The present invention relates generally to improvements in the art of filtering air, and relates more particularly to improvements in the construction and operation of filters adapted to filter air being introduced as part of the explosive mixture to the combustion chamber of an internal combustion engine.

The primary object of the present invention is to provide an improved air filter for internal combustion engines or the like which is extremely simple and compact in construction and which is moreover highly efficient in actual operation.

Another specific object of the invention is to provide an improved air filter which comprises a minimum number of parts and which is capable of being readily assembled and dismantled by a novice with utmost ease and rapidity.

Another specific object of this invention is to provide an improved air filtering assemblage which may be readily applied to an internal combustion engine of any type and in which the filtering element is easily accessible without need for using special tools.

Another specific object of our invention is to provide an improved air filter which embodies a resilient filtering body and in which the parts are so constructed and assembled as to permit the filtering element to pulsate or vibrate during operation, thereby tending to shake off or expel debris from the exterior to maintain the exterior of the filter in clean condition.

Another specific object of this invention is to provide an improved air filter especially adapted for use in connection with internal combustion engines and which embodies a resilient filter element confined in a novel manner within a housing which is so constructed and assembled that the resilient filter element or filtering body maintains the unit in assembled condition.

Another specific object of the present invention is to provide an improved air filter which may be readily constructed and assembled at extremely low cost and in which the parts of the unitary assemblage are resiliently supported so as to permit exceptionally rough treatment without danger of damage.

Still another specific object of our present invention is to provide an improved and novel air filtering assemblage embodying a resilient filter element which in itself automatically seals the various parts and constantly seats itself upon the end plates forming the housing.

A further specific object of the present invention is to provide an improved air filter for internal combustion engines in which the filtering element is compressible between relatively movable end plates which are effectively guided in their movement, the filter being automatically operable to progressively shut off the air supply as it becomes dirty or filled with debris to thereby slow down or shut off the engine operation.

An additional specific object of the present invention is to provide an improved filter which comprises, a pair of spaced plates, a body of resilient filtering material disposed between the plates, and means coacting with the plates to connect the same while permitting relative movement thereof and compression of the filtering body.

These and other specific objects and advantages of the present invention will become apparent from the following detailed description.

A clear conception of the several features constituting the present improvement, and of the mode of construction and operation of typical air filters embodying the invention, may be had by referring to the drawing accompanying and forming a part of this specification wherein like reference characters designate the same or similar parts in the various views.

Fig. 1 is a more or less diagrammatic view of a typical internal combustion engine of the type used in power lawn mowers and having one of the improved filters applied thereto;

Fig. 2 is a part sectional side elevation of a typical air filter embodying the invention;

Fig. 3 is a transverse section through the filter of Fig. 2 taken along the line 3—3;

Fig. 4 is an exploded view of the filter assemblage shown in Fig. 2;

Fig. 5 is another side elevation of the filter of Fig. 2, but showing the same in compressed condition as when partially filled with debris;

Fig. 6 is a transverse section through a filter of somewhat different configuration than that shown in the preceding views but which also embodies the features of the present invention, the modified filter illustrated in this view being drawn to a slightly reduced scale.

While the invention has been shown and described herein as being especially advantageously applicable for use with an internal combustion engine of a particular type and as embodying a filter element formed of a sponge like material and of substantially circular or elliptical cross section provided with a central bore communicable with the air inlet opening, it is not desired or intended to unnecessarily restrict or limit the invention to such usage or to the construction herein shown and described since air filter assemblages constructed in accordance with the invention may be used in conjunction with any type of internal combustion engine, air compressors, or the like and the assemblages may obviously embody any desired configuration and size. It is also contemplated that certain specific descriptive terms used herein shall be given broadest possible interpretation consistent with the disclosure.

Referring to the drawing, the improved filter designated generally by the numeral 10 is adapted to be connected in a usual manner to the inlet 11 of the carburetor 12 of an internal combustion engine 13 as shown in Fig. 1; and the filter may be disposed vertically or horizontally and may be generally cylindrical, elliptical or any other shape dependent upon space requirements, capacity and the like.

Referring particularly to Figs. 2 to 5 of the drawing, the filter assemblage shown therein is of generally cylindrical shape and comprises, a pair of spaced end plates or caps 14, 15, the opposed plates preferably being concave or dish-shaped as shown with the plate 15 being provided with an outlet opening 16 adapted for connection to the inlet 11 of the carburetor 12; a cylindrical body 17 of suitable resilient filtering material such as a foamed plastic or sponge rubber disposed between the plates 14, 15 and seated therein, the resilient and compressible filtering body being preferably provided with a central bore 18 extending therethrough and communicating at one end with the opening 16 in the plate 15; and means such as a generally U-shaped retaining and guide member or bail 19 coacting with the plates 14, 15 to connect the same and normally prevent displacement thereof from the filtering body 17, the intermediate leg 20 of the member 19 being seated upon the plate 14 with the legs 21, 22 of the member 19 being connected with the plate 15 as by means of hooks 23, 24 engageable within opposed openings or slots 25, 26 respectively in the plate 15 to thereby permit relative movement of the plates 14, 15 and compression of the body 17 as will hereinafter more fully appear. To prevent lateral displacement of the plate or cap 14 and guide the same in its movement toward and away from the plate 15, it is also preferable to form diametrically opposed grooves 27, 28 in the plate 14, the grooves 27, 28 slidably receiving the respective legs 21, 22 of the member 19 as shown.

Referring now to the somewhat modified filter 10 shown in Fig. 6, it will be noted that this assemblage also comprises, a pair of spaced end plates or caps 14', 15' of generally dish-shape, a body 17' of suitable filtering material disposed between and seated within the plates 14', 15', and a generally U-shaped connecting member coacting with the plates 14', 15' and having joining and guiding legs 21', 22' extending therebetween to normally prevent displacement of the plates 14', 15' and body 17' while permitting relative movement of the plates and compression of the filter body. While the structure thus shown and described with reference to Fig. 6 is essentially the same as that shown and described with reference to Figs. 2 to 5, it has been found that there is a tendency for the wall of the filter element 17' to collapse whenever the wall of this filter body is not of uniform width or whenever the shape of the body 17' is such that a wall of uniform thickness or width would be relatively long and laterally unsupported, and to compensate for this tendency and thereby prevent collapse on inward distortion of the narrow portion of the wall of the body 17', it is desirable to provide not only a central bore 18' communicating with the discharge opening 16' of the plate 15' but to also cut openings 30, 31 extending through the body 17' in parallel relation to and on opposite sides of the bore 18' as shown. This construction has been found to substantially eliminate the tendency for the narrow portion of the wall of the body 17' to collapse, but other means such as a compression spring or the like disposed within the opening 18' may be utilized for this purpose as long as the means for preventing collapse of the wall of the body 17' does not undesirably interfere with compression of the body of filtering material.

In operation and with the improved filter 10 assembled and attached to the internal combustion engine in an obvious manner, the more or less rhythmic breathing of the engine 13 will cause air to be periodically drawn through the body 17 from the exposed periphery thereof inwardly to the bore 18 and then through the outlet 16 and into the carburetor 12, the air being filtered as it passes through the numerous interstices in the wall of the filtering body 17. Since the engine demand for air is periodic or intermittent and since the end plate or cap 14 is closed and is movable relative to the plate 15, the intermittent suction action to which the body 17 of filtering material is subjected will cause this body to periodically or intermittently compress between the plates 14, 15 and cause the same to vibrate or pulsate during operation, the interstices of the compressible filter bed being thereby caused to contract and expand and the vibrating action thus tending to shake off and prevent accumulations of grass and other large pieces of debris on the exterior of the filter body. As the engine 13 continues for long periods of time in its operation, more and more dust, dirt and other debris will accumulate within the filter body 17, 17' thereby restricting the free passage of air therethrough, and the suction on the end plate 14, 14' thus will become progressively stronger and will cause abnormally greater cyclic displacement of the end plate and if unattended, the body 17, 17' of filtering material will compress to such a degree that the interstices will gradually close and thus cause the engine to shut down due to the failure to supply air to the carburetor. This abnormal cyclic condition or slowdown of the engine will warn the operator of the fact that the filter body 17, 17' requires cleaning or replacement, and this may be readily accomplished merely by swinging the legs 21, 22 or 21', 22' as the case may be toward each other to cause the legs to become unhooked from the plate 15, 15' and thereby permit ready access to the filter element 17, 17' which may then be cleaned or entirely replaced.

From the foregoing detailed description, it is believed apparent that the present invention contemplates the provision of an air filter which is extremely simple and compact in construction and which is moreover highly efficient and economical in operation. The improved device comprises a minimum number of parts which may be readily manufactured and assembled and which may be dismantled for ready cleaning without the necessity of using any tools whatsoever. The resiliency of the improved assemblage minimizes danger of breakage due to rough usage and results in a device which is more or less self-cleaning as well as automatically operable to warn the operator of the engine when the filter element requires cleaning or replacement. The several parts of the assemblage are retained in their relative positions and are guided in their movement during the operation of the engine in a novel manner, and the assemblage is maintained in assembled condition by the self-seating resilient filter element. As indicated, the body of the filter 10 may be of any desired configuration and size so as to meet space requirements as well as capacity, and if it is found necessary to help support the wall of the body 17, 17', a spring or other suitable means may be provided within the bore 18, 18' but in any case the means provided for retaining the wall of the body of the filter material against displacement should be such as to permit compression of the body 17, 17' to thereby allow for the pulsating or vibrating action hereinabove described. The improved filter assemblage has proven extremely satisfactory in actual tests and these tests have shown that the engine may be operated for exceedingly long periods of time before the filtering element requires cleaning or replacement.

It should be understood that it is not desired or intended to limit this invention to the exact details of construction herein shown and described since various modifications within the scope of the appended claims may occur to persons skilled in the art to which this invention pertains.

We claim:

1. A filter assemblage comprising, a pair of opposed cup-shaped members, one of which is imperforate and the other of which is provided with an air outlet opening, a body of resilient filtering material disposed between and seated within said members to normally maintain the same in spaced apart relation to outwardly expose a major portion of the sides of said body, and guide means slidably engaged by said imperforate member and detachably secured to said other member for permitting free relative movement between said members and compression and pulsation of said body.

2. A filter assemblage comprising, a pair of spaced plate-like members, one of which is imperforate and is formed with diametrically opposed grooves and the other of which is provided with an air outlet opening and with diametrically opposed sockets, a body of resilient filtering material disposed between said members with a major portion of the sides thereof outwardly exposed, and a generally U-shaped connecting element having the legs thereof slidably seated within the grooves of said imperforate member and detachably engaged within the sockets of said other member to prevent displacement of said body while permitting relative movement of said members and compression of said body therebetween.

3. A filter assemblage comprising, a pair of opposed cup-shaped members, one of which is imperforate and is formed with diametrically opposed grooves and the other of which is provided with a central air outlet opening, and with diametrically opposed sockets, a body of resilient filtering material disposed between and seated within said members to normally maintain the same in spaced apart relation to outwardly expose a major portion of the sides of said body, said body having a central bore closed at one end by said imperforate plate and communicating at the other end with said outlet opening, and a generally U-shaped connecting element having the legs thereof slidably seated within the grooves of said imperforate member and having hooks at the free ends thereof detachably receivable within the sockets of said other member to prevent displacement of said body while permitting relative guided movement of said members and compression of said body therebetween.

4. A filter assembly comprising, a pair of spaced apart plate-like members, one of said members being imperforate and the other of which is provided with an air outlet opening, a body of resilient filtering material disposed between said members with a major portion of the sides thereof outwardly exposed, and a bail spanning said imperforate member and connected with said other member, means on opposite sides of said imperforate member for guidingly and slidably engaging said bail to thereby prevent displacement of said body while permitting relative movement between said members toward and away from each other and compression of said body.

5. A filter assemblage comprising, a pair of spaced plate-like members, one of which is imperforate and is formed with diametrically opposed grooves and the other of which is provided with an air outlet opening, a body of resilient filtering material disposed between said members with a major portion of the sides thereof outwardly exposed, and a generally U-shaped connecting element having the legs thereof slidably coacting with the grooves of said imperforate member and detachably secured to said other member to prevent displacement of said body while permitting relative movement of said members and compression of said body therebetween.

References Cited in the file of this patent

UNITED STATES PATENTS

| | | |
|---|---|---|
| 842,529 | Dittmar | Jan. 29, 1907 |
| 1,896,640 | Moulding | Feb. 7, 1933 |
| 2,069,379 | Moe | Feb. 2, 1937 |
| 2,239,731 | Neumann | Apr. 29, 1941 |
| 2,521,060 | Hallinan | Sept. 5, 1950 |
| 2,575,400 | Shirk et al. | Nov. 20, 1951 |

FOREIGN PATENTS

| | | |
|---|---|---|
| 489,109 | Great Britain | July 19, 1938 |
| 545,089 | Great Britain | May 11, 1942 |
| 559,728 | Great Britain | Mar. 2, 1944 |